United States Patent
Shimizu et al.

(10) Patent No.: US 9,346,339 B2
(45) Date of Patent: May 24, 2016

(54) VEHICLE DOOR

(75) Inventors: Kenji Shimizu, Toyokawa (JP); Hiroaki Yamazaki, Gamogori (JP); Shigenobu Ohsawa, Toyokawa (JP)

(73) Assignee: SHIROKI CORPORATION, Fujisawa-Shi (JP)

( * ) Notice: Subject to any disclaimer, the term of this patent is extended or adjusted under 35 U.S.C. 154(b) by 80 days.

(21) Appl. No.: 14/343,508

(22) PCT Filed: Sep. 5, 2012

(86) PCT No.: PCT/JP2012/072593
§ 371 (c)(1),
(2), (4) Date: Mar. 7, 2014

(87) PCT Pub. No.: WO2013/035734
PCT Pub. Date: Mar. 14, 2013

(65) Prior Publication Data
US 2014/0217773 A1    Aug. 7, 2014

(30) Foreign Application Priority Data
Sep. 9, 2011 (JP) .................................. 2011-197437

(51) Int. Cl.
*B60J 5/04* (2006.01)
(52) U.S. Cl.
CPC ................ *B60J 5/042* (2013.01); *B60J 5/0402* (2013.01); *B60J 5/0406* (2013.01); *B60J 5/0408* (2013.01)
(58) Field of Classification Search
CPC ........ B60J 5/042; B60J 5/0402; B60J 5/0406; B60J 5/0408
See application file for complete search history.

(56) References Cited

U.S. PATENT DOCUMENTS

| 1,876,589 | A | * | 9/1932 | Ball | B60J 5/0402 49/378 |
| 2003/0042756 | A1 | * | 3/2003 | Ogawa et al. | 296/146.9 |

(Continued)

FOREIGN PATENT DOCUMENTS

| DE | 19854775 A1 | * | 2/2000 | B60J 5/00 |
| DE | 19962988 A1 | * | 5/2000 | B60J 5/00 |

(Continued)

OTHER PUBLICATIONS

International Search Report dated Dec. 11, 2012 issued in corresponding PCT/JP2012/072593 application (pp. 1-2).

(Continued)

*Primary Examiner* — Glenn Dayoan
*Assistant Examiner* — Paul Chenevert
(74) *Attorney, Agent, or Firm* — Millen, White, Zelano & Branigan, P.C.

(57) ABSTRACT

[PROBLEM TO BE SOLVED]
To provide a vehicle door, in which the arrangement of the reinforcing bracket is not limited, and the strength of the joined portion between the door frame and the door panel can be improved. The vehicle door has a portion of a door frame that forms a window opening inserted into the inside of a door panel. The door frame is provided with a stepped portion which separates a surface area on the frame forming portion side and a surface area on the insertion portion side from each other; the surface area on the insertion portion side that is continuous with the stepped portion is formed as an inner-panel facing surface facing the inner panel; the inner-panel facing surface is shifted in a direction away from the inner panel by the stepped portion; and the reinforcing bracket is made to overlap the shifted inner-panel facing surface therealong.

8 Claims, 20 Drawing Sheets

(56) References Cited

U.S. PATENT DOCUMENTS

| | | | |
|---|---|---|---|
| 2004/0221512 A1 | 11/2004 | Hoffman et al. | |
| 2006/0181107 A1* | 8/2006 | Nishikawa | 296/146.2 |
| 2007/0084130 A1* | 4/2007 | Gaustad et al. | 49/502 |
| 2011/0011005 A1* | 1/2011 | Halliwell et al. | 49/502 |
| 2012/0124912 A1* | 5/2012 | Okada et al. | 49/501 |

FOREIGN PATENT DOCUMENTS

| | | | | |
|---|---|---|---|---|
| DE | 10237436 A1 * | 3/2004 | | B60J 5/04 |
| EP | 2433827 A1 * | 3/2012 | | B60J 5/04 |
| JP | 60-147515 U | 10/1985 | | |
| JP | 63-180419 U | 11/1988 | | |
| JP | 5-270265 A | 10/1993 | | |
| JP | 4295069 B2 | 4/2009 | | |
| WO | WO 2013047632 A1 * | 4/2013 | | B60J 5/04 |
| WO | WO 2013176004 A1 * | 11/2013 | | B60J 5/04 |

OTHER PUBLICATIONS

English Translation Abstract of JP S60-147515 published Oct. 1, 1985.

English Translation Abstract of JP S63-180419 published Nov. 22, 1988.

English Translation Abstract of JP 05-270265 published Oct. 19, 1993.

English Translation Abstract of JP 2005-153768 published Jun. 16, 2005.

* cited by examiner

VEHICLE DOOR

TECHNICAL FIELD

The present invention relates to a vehicle door, and in particular relates to the structure of a joined portion between a door frame and a door panel.

BACKGROUND ART

Vehicle doors which are structured such that a door frame (sash) is mounted to a door panel and that a reinforcing bracket (reinforcement member) which supports a door lock mechanism or a door mirror is fixed together to a joined portion between an inner panel, which constitutes a component of the door panel, and the door frame are known in the art. It is possible to improve the strength of the joined portion between the door frame and the inner panel by interposing the reinforcing bracket, having a high rigidity, therebetween.

SUMMARY OF INVENTION

Technical Problem

In the case where a reinforcing bracket is used as a strengthening member for a joined portion between the door frame and the inner panel, the reinforcing bracket is fixed in such a manner as to be sandwiched between the door frame and the inner panel. From the viewpoint of improvement in strength, it is desirable to secure as large an overlapping area of the reinforcing bracket with the door frame and the inner panel as possible. However, at the upper edge of the inner panel, the distance between the inner panel and the door frame is small, so that the installation space for the reinforcing bracket is limited.

The present invention has been made in view of the problems described above, and an object of the present invention is to provide a vehicle door in which limitations on the installation of the reinforcing bracket are few and in which the strength of the joined portion between the door frame and the door panel can be improved.

Solution to Problem

The present invention relates to a vehicle door which includes: a door frame having an insertion portion which is inserted in between an inner panel and an outer panel, which constitute a door panel and is supported therebetween, and a frame forming portion which projects from the door panel to form a window opening; and a reinforcing bracket which is fixed between the insertion portion of the door frame and the inner panel. The door frame has a projecting portion that projects from a design portion toward the vehicle interior side across an area from the frame forming portion to the insertion portion. At least one of projecting-portion forming surfaces which form the projecting portion is provided with a stepped portion which separates a surface area on the frame forming portion side and a surface area on the insertion portion side from each other, the surface area on the insertion portion side that is continuous with the stepped portion is formed as an inner-panel facing surface which faces the inner panel, and the inner-panel facing surface is shifted in a direction away from the inner panel by the stepped portion. In addition, the reinforcing bracket overlaps with the shifted inner-panel facing surface there along.

It is desirable that the projecting-portion forming surfaces be provided with a vehicle interior side wall surface which faces toward the vehicle interior side, that opposed wall surfaces be positioned on the opposite sides of the vehicle interior side wall surface and positioned away from each other toward the inner peripheral side and the outer peripheral side of the door frame, respectively, and that the stepped portion be formed on the opposed wall surface on the outer peripheral side. In this case, it is advisable that a weather strip be supported on a surface area of the outer peripheral side opposed wall surface which is positioned on the frame forming portion side.

It is required to provide a predetermined amount of clearance between the upper edge of the inner panel and the door frame for the sake of absorbing manufacturing errors, etc. In the vehicle door according to the present invention, it is possible for the upper edge of the inner panel to be positioned to face the stepped portion on the projecting portion of the door frame and for the upper edge of the inner panel to be made substantially flush with the surface area on the frame forming portion side of the projecting-portion forming surfaces, which is continuous with the stepped portion. According to this configuration, the clearance between the upper edge of the inner panel and the door frame is not exposed externally, which improves the appearance.

Advantageous Effects of Invention

According to the present invention described above, the strength of the joined portion between the door frame and the door panel of the vehicle door can be improved because the room between the inner-panel facing surface of the projecting portion and the inner panel at the insertion portion of the door frame increases, which makes it possible to heighten the upper limit position for the installation of the reinforcing bracket without the reinforcing bracket interfering with the inner panel.

DESCRIPTION OF EMBODIMENTS

Figure 1:
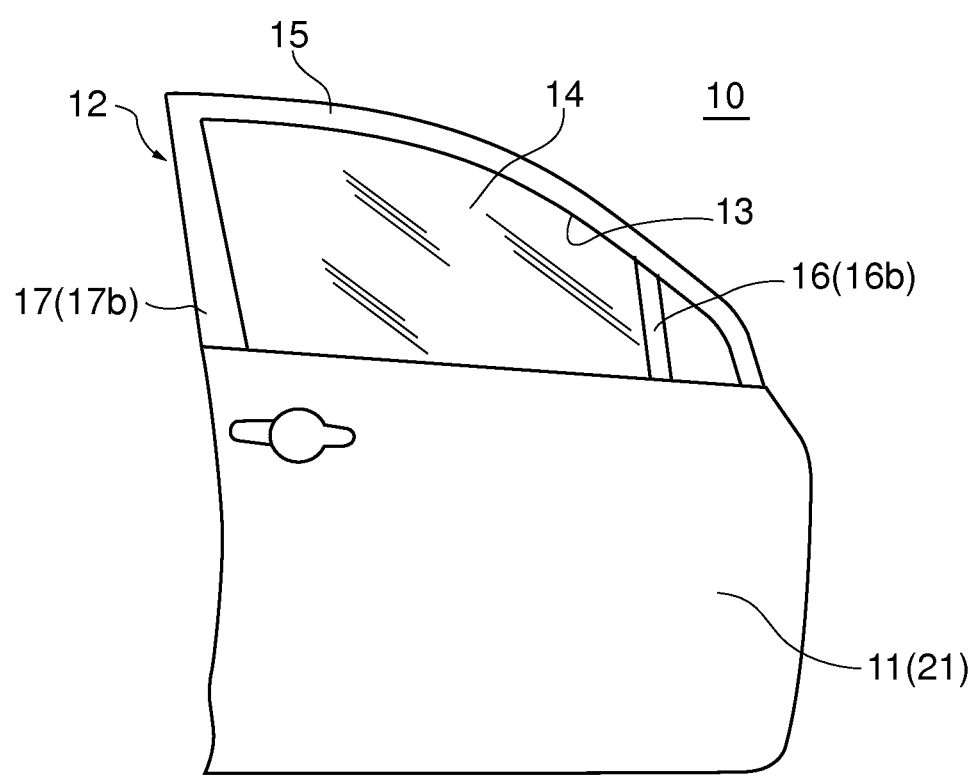
FIG. 1 is a side view of a vehicle door to which the present invention is applied, viewed from the vehicle exterior side.

FIG. 1 shows a schematic structure of a front door (hereinafter referred to as a door) 10, of a passenger vehicle, to which the present invention is applied. The door 10 is provided with a door panel 11 and a door frame 12, and the area of the door 10 which is surrounded by the upper edge of the door panel 11 and the inner periphery of the door frame 12 defines a window opening 13. A vertically movable door pane 14 is provided in the window opening 13. The door frame 12 is provided with an upper frame 15 which forms the upper edge of the door 10, a front side frame 16 which extends downward from the front end of the upper frame 15, and a rear side frame 17 which extends downward from the rear end of the upper frame 15. In the following descriptions, the side of the door frame 12 which faces the window opening 13 is referred to as the inner peripheral side and the opposite side of the door frame 12 is referred to as the outer peripheral side. In addition, the forward/rearward direction and the upward/downward direction in the following descriptions correspond to the forward/rearward direction and the upward/downward direction of the vehicle, to which the door 10 is mounted, respectively.

Figure 2:
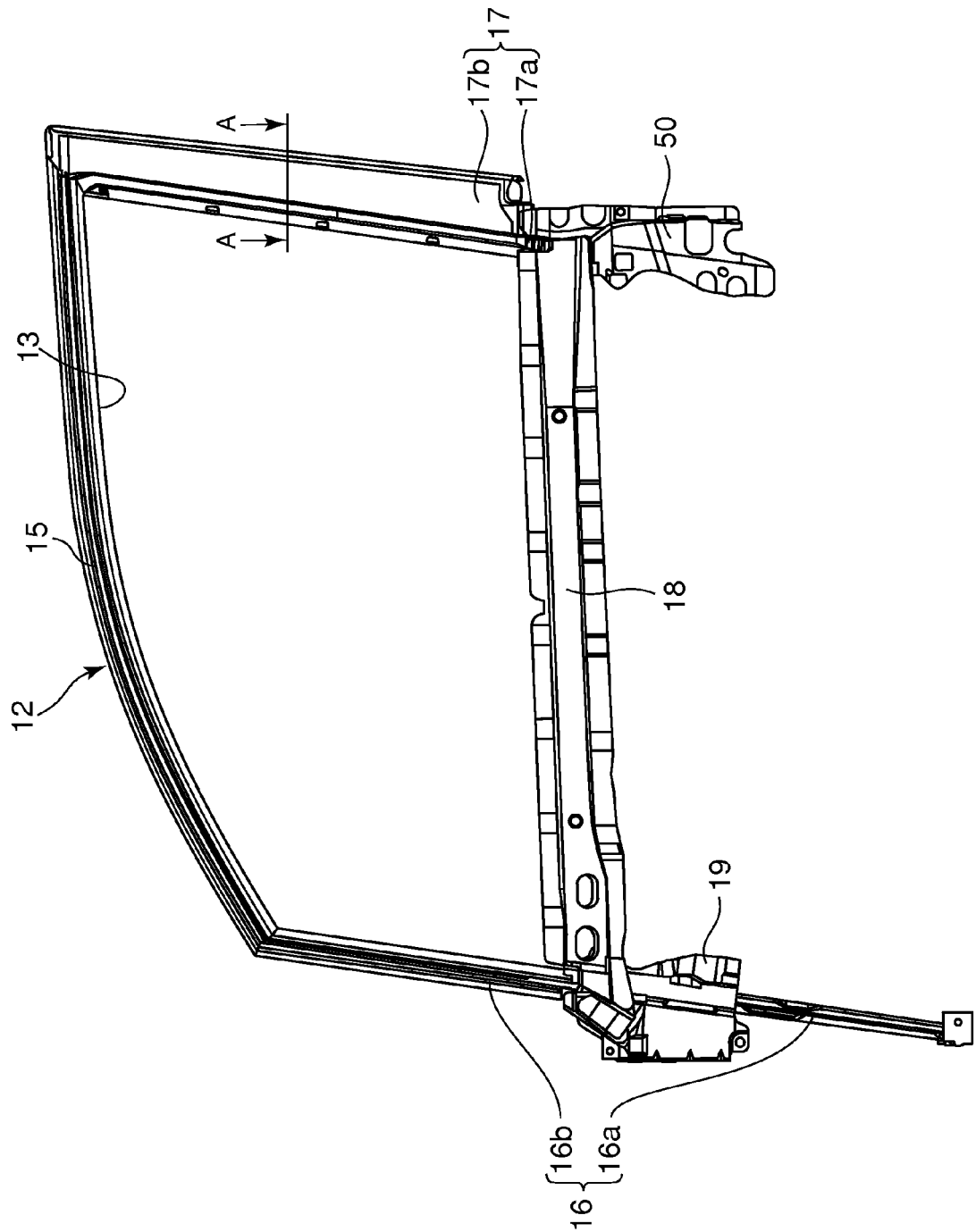
FIG. 2 is a diagram of a door frame and a reinforcement member that constitute components of the door shown in FIG. 1, viewed from the vehicle interior side.
Figure 3:
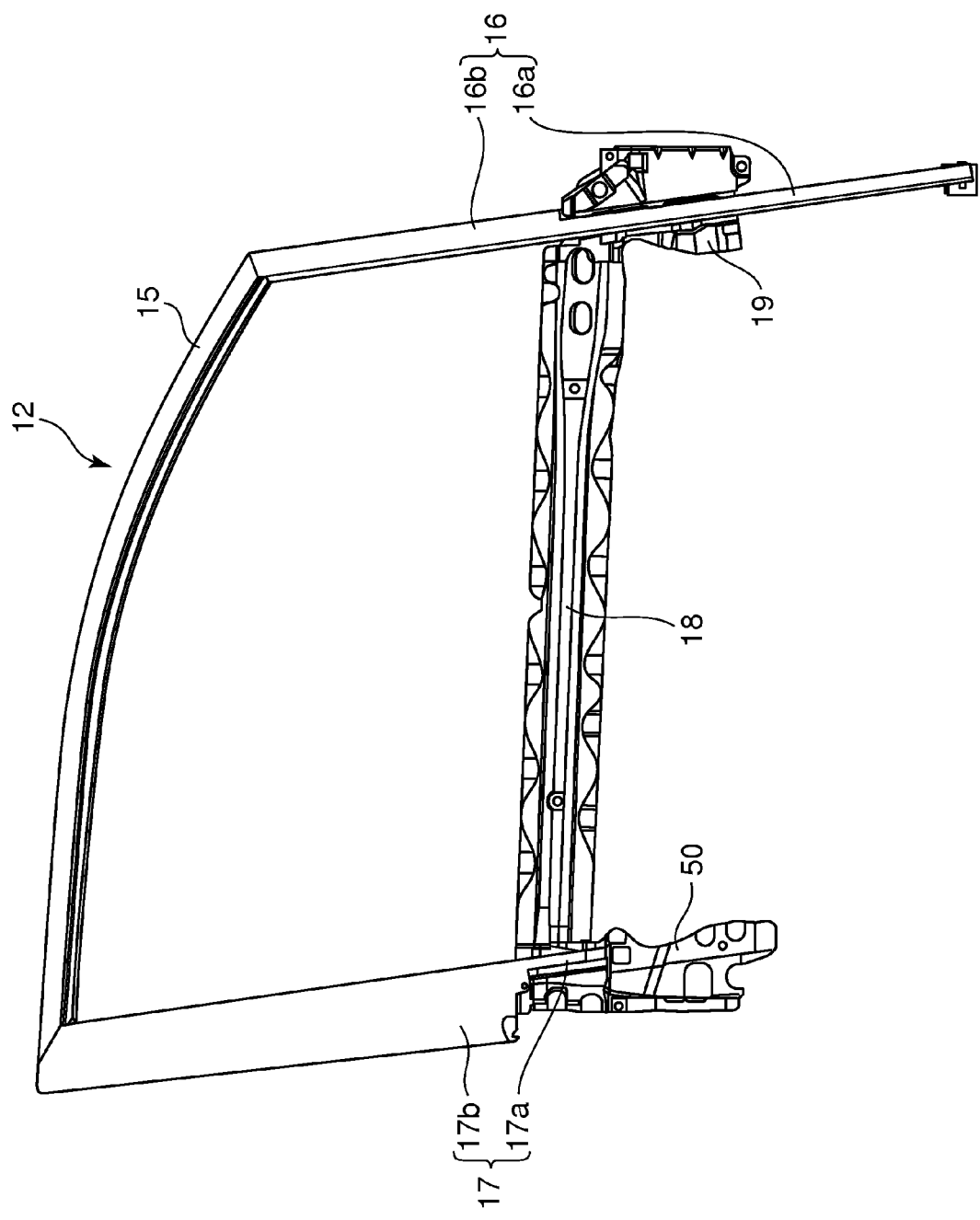
FIG. 3 is a diagram of the door frame and the reinforcement member that constitute components of the door shown in FIG. 1, viewed from the vehicle exterior side.

The door panel 11 is provided with an outer panel 21 (FIG. 1) which is positioned on the vehicle exterior side and an inner panel 22 which is positioned on the vehicle interior side. FIGS. 14 through 19 show a part of the inner panel 22, and the inner panel 22 is shown by imaginary lines (two-dot chain lines) in FIGS. 14 and 16 so that components which are positioned behind (on the vehicle exterior side) the inner panel 22 and are overlaid thereon as viewed from the vehicle interior side are easy to see. As shown in FIGS. 2 and 3, lower portions of the front side frame 16 and the rear side frame 17 are formed as insertion portions 16a and 17a, which are inserted into the space between the outer panel 21 and the inner panel 22 and supported therebetween. In the completed state of the door 10 shown in FIG. 1, the insertion portions 16a and 17a are not exposed to the appearance of the door 10, and only frame exterior portions (frame forming portions) 16b and 17b project upward from the door panel 11.

As shown in FIGS. 2 and 3, a beltline reinforcement member 18, a front bracket (reinforcing bracket) 19 and a lock reinforcement member (reinforcing bracket) 50 are provided at a position where the insertion portion 16a of the front side frame 16 and the insertion portion 17b of the rear side frame 17 are connected. The lock reinforcement member 50 supports a door lock mechanism. The beltline reinforcement member 18 is extended in the forward/rearward direction, a portion of the beltline reinforcement member 18 in the vicinity of the front end thereof is fixed to the front bracket 19, and a portion of the beltline reinforcement member 18 in the vicinity of the rear end thereof is fixed to the lock reinforcement member 50. The front bracket 19 is fixed to the insertion portion 16a of the front side frame 16. The lock reinforcement member 50 is fixed to the insertion portion 17a of the rear side frame 17 by a structure which will be discussed later. The insertion portions 16a and 17a of the door frame 12, the beltline reinforcement member 18, the front bracket 19 and the lock reinforcement member 50 are each fixed to the inner panel 22. The door 10 according to the present embodiment has a feature in the joined portion between the rear side frame 17 and the lock reinforcement member 50, and this feature will be discussed hereinafter.

Figure 4:
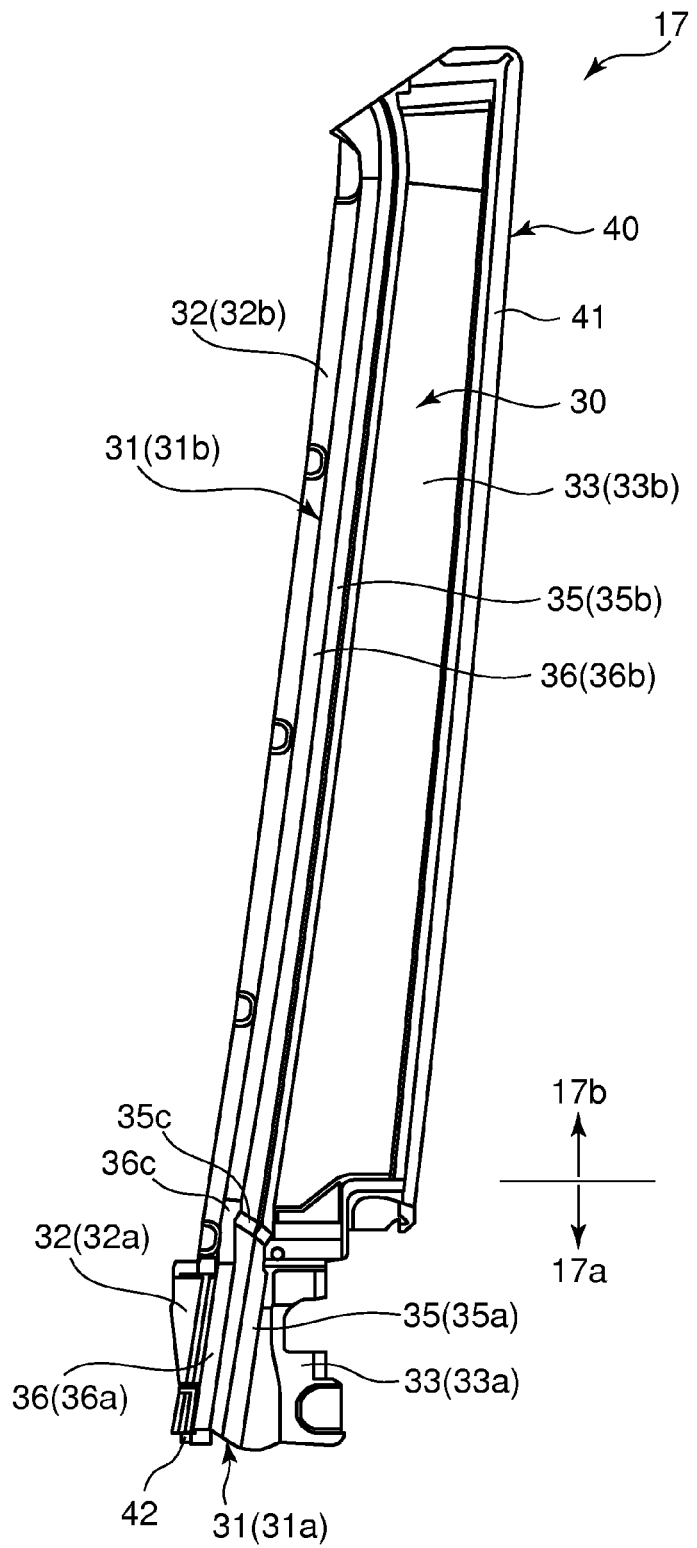
FIG. 4 is a diagram of a rear side frame that constitutes a component of the door frame, viewed from the vehicle interior side.
Figure 5:
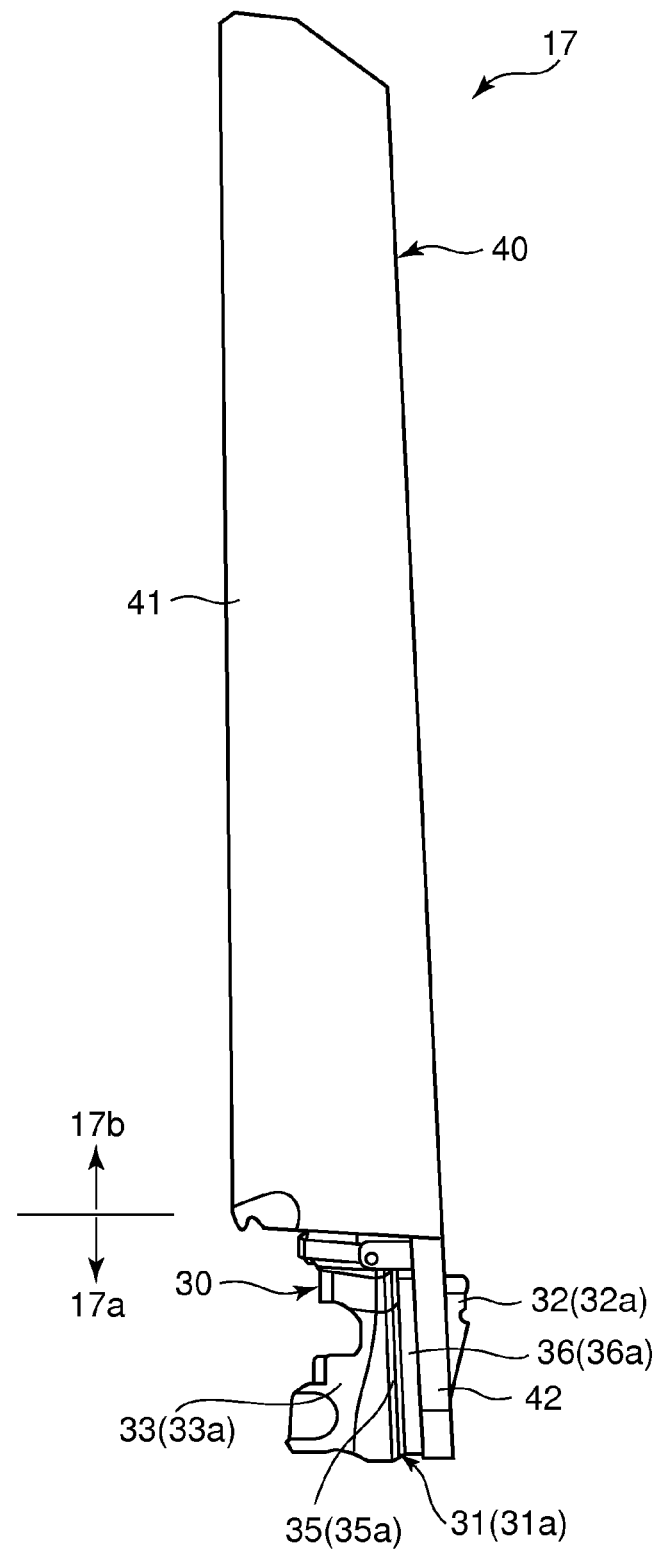
FIG. 5 is a diagram of the rear side frame, viewed from the vehicle exterior side.
Figure 6:
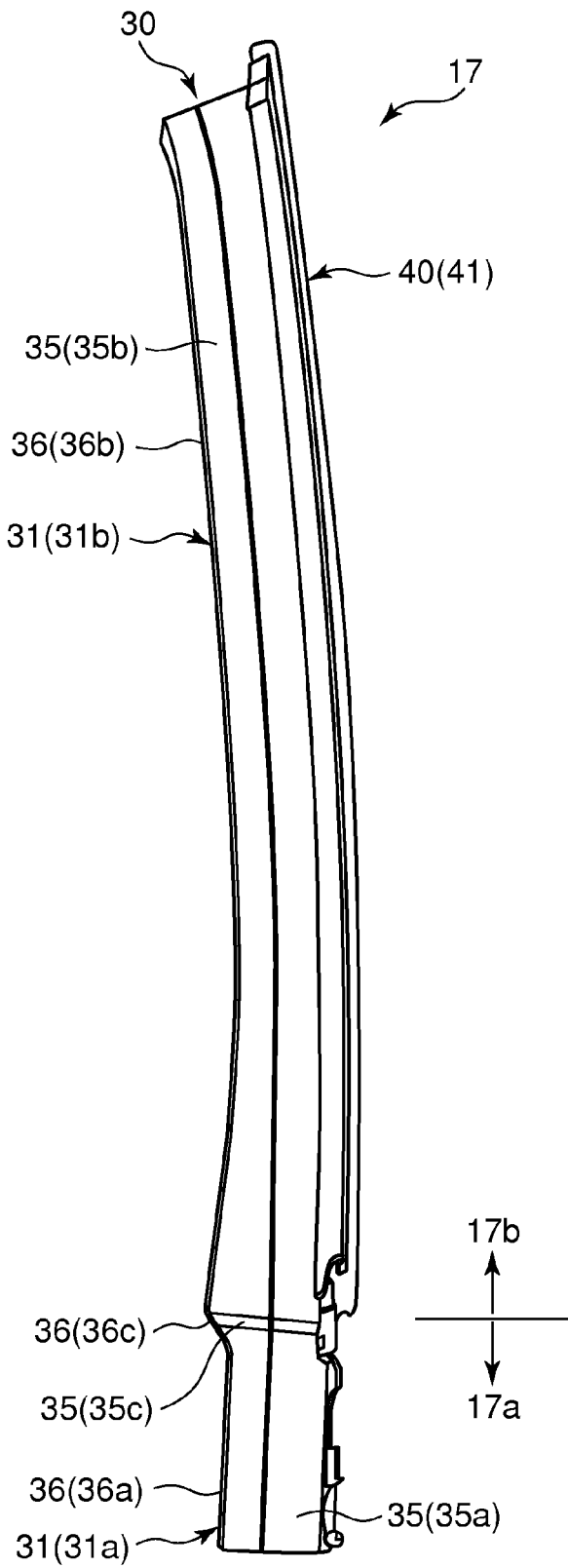
FIG. 6 is a diagram of the rear side frame, viewed from the rear.
Figure 7:
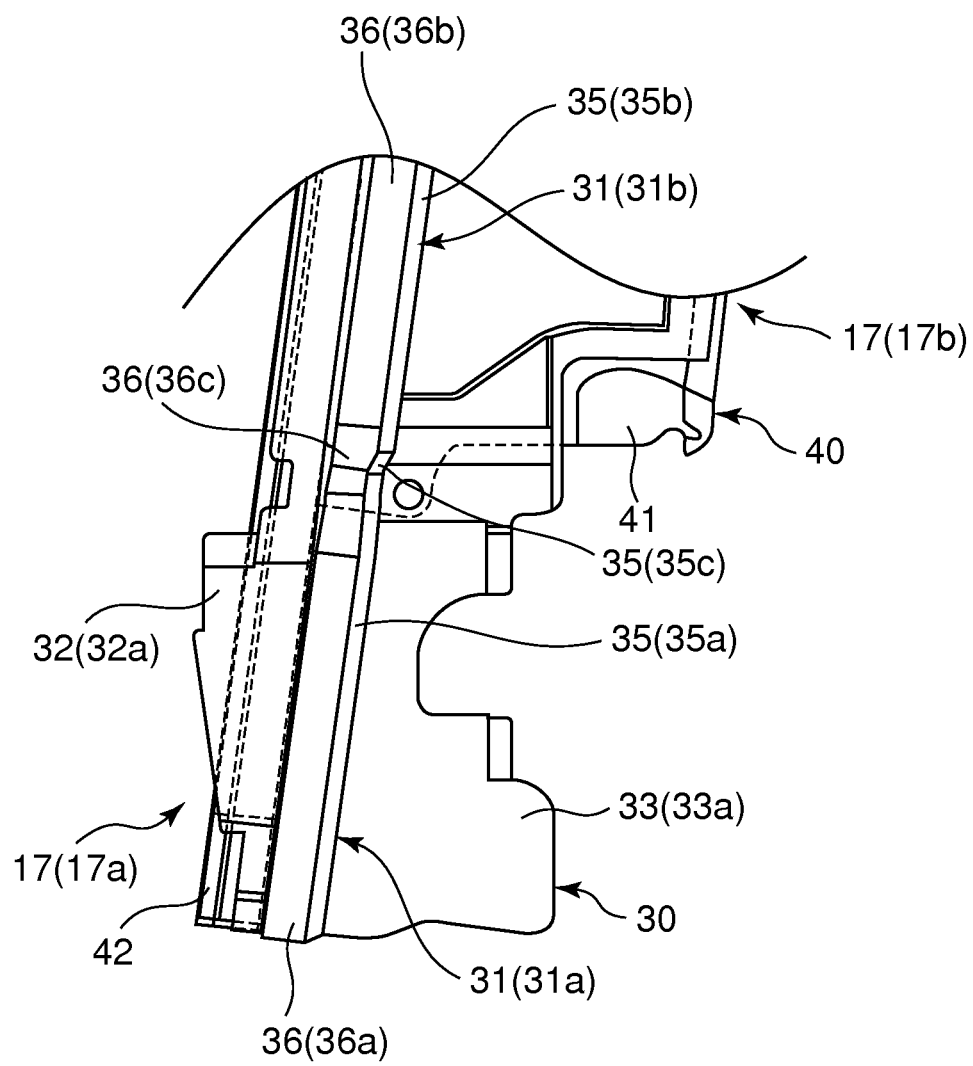
FIG. 7 is an enlarged diagram of an insertion portion of the rear side frame.

FIGS. 4 through 6 show only the rear side frame 17 out of the components of the door frame 12. The rear side frame 17 is formed of a combination of an inner frame 30 positioned on the vehicle interior side and an outer frame 40 positioned on the vehicle exterior side. Each of the inner frame 30 and the outer frame 40 is formed of a sheet metal material. The inner frame 30 is provided with a projecting portion 31 having a pocket-like cross section which projects toward the vehicle interior side, and an inner peripheral side flange portion 32 and an outer peripheral side flange portion 33 which project from the projecting portion 31 toward both sides thereof. As projecting-portion forming surfaces which form the projecting portion 31, the inner frame 30 is provided with an inner peripheral side wall surface (opposed wall surface) 34 and an outer peripheral side wall surface (opposed wall surface) 35 which face each other while being spaced from each other toward the inner peripheral side and the outer peripheral side of the door frame 12 (in the forward/rearward direction), respectively, and is further provided with a vehicle interior side wall surface 36 which connects the inner peripheral side wall surface 34 and the outer peripheral side wall surface 35 and faces toward the vehicle interior side. The inner peripheral side wall surface 34 is continuous with the inner peripheral side flange portion 32, and the outer peripheral side wall surface 35 is continuous with the outer peripheral side flange portion 33.

Figure 17:
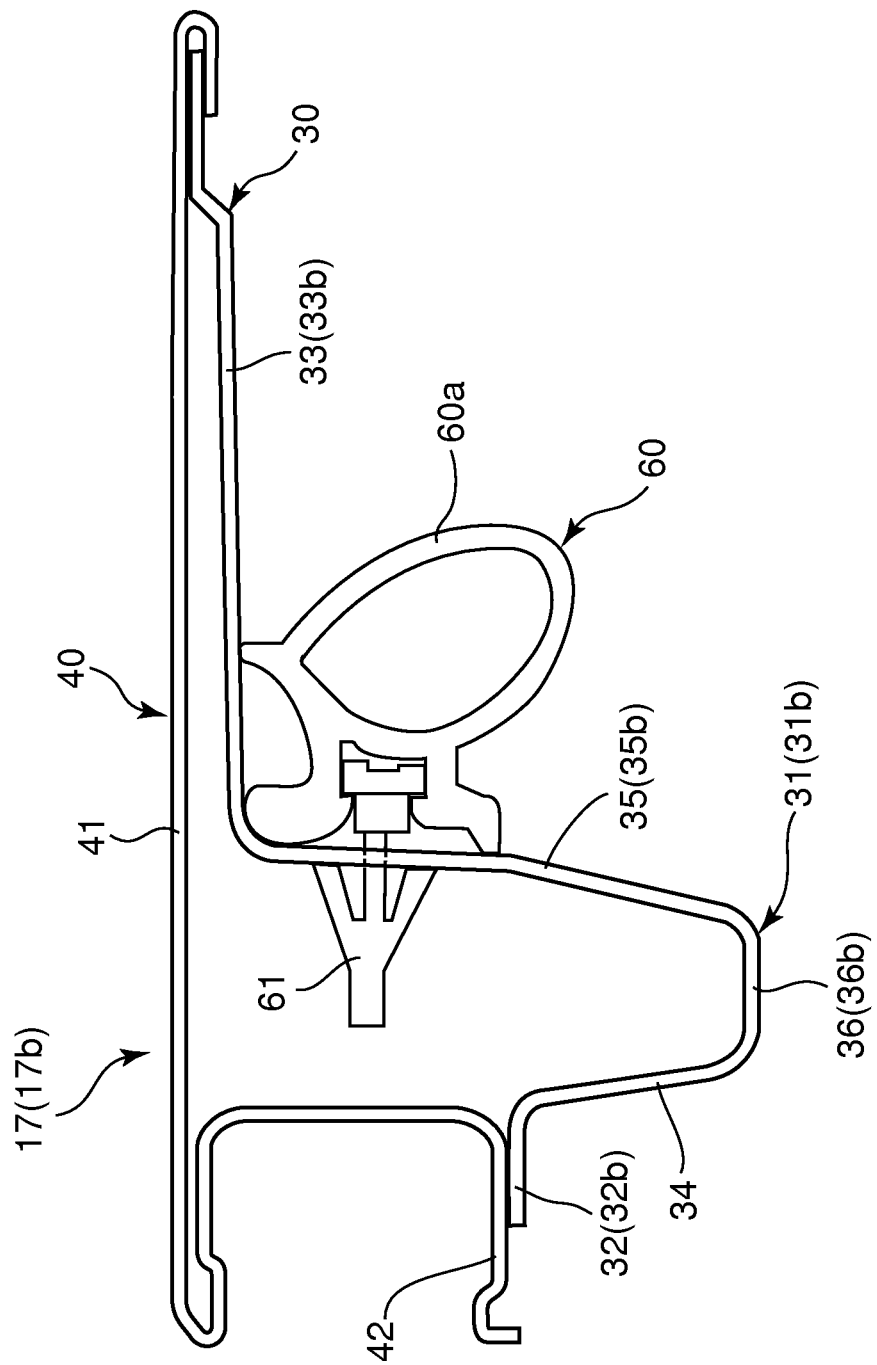
FIG. 17 is a cross sectional view taken along the line A-A shown in FIG. 2.
Figure 18:
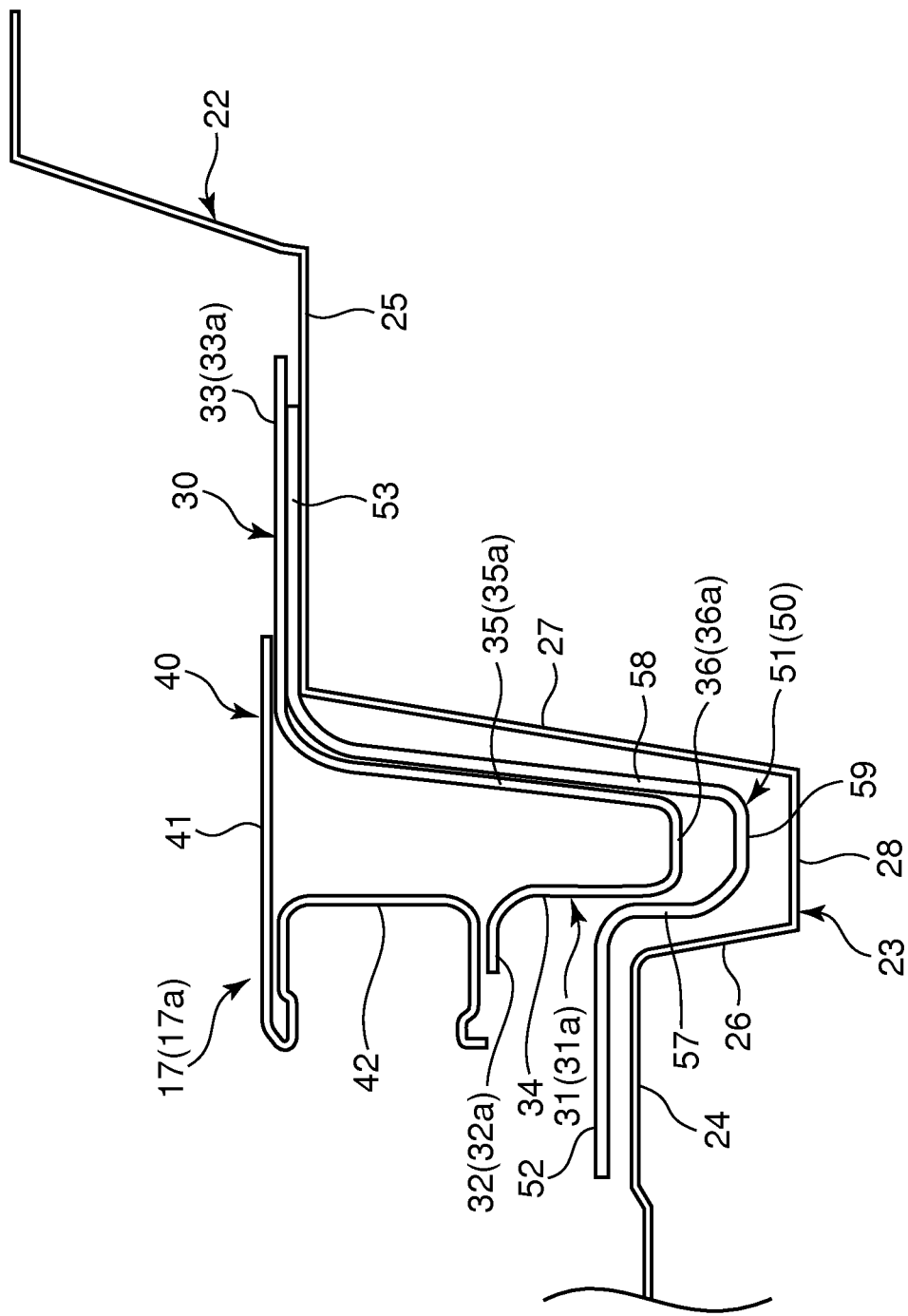
FIG. 18 is a cross sectional view taken along the line B-B shown in FIG. 14.

FIG. 17 shows across sectional shape of the frame exterior portion 17b of the rear side frame 17, and FIG. 18 shows a cross sectional shape of the insertion portion 17a of the rear side frame 17. As can be seen from these drawings, the projecting portion 31, the inner peripheral side flange portion 32 and the outer peripheral side flange portion 33 of the inner frame 30 at the insertion portion 17a are different in detailed shape from those at the frame exterior portion 17b. In the projecting portion 31, the insertion portion 17a is made smaller in sectional area than the frame exterior portion 17b. More specifically, a stepped portion 35c is formed between a surface area of the outer peripheral side wall surface 35 on the insertion portion 17a side (hereinafter referred to as an inner-panel facing surface 35a) and a surface area of the outer peripheral side wall surface 35 on the frame exterior portion 17b side (hereinafter referred to as a reference surface 35b). The stepped portion 35c is an inclined surface which progressively approaches the inner peripheral side wall surface 34 in a direction from the frame exterior portion 17b side toward the insertion portion 17a side. Due to this structure, the inner-panel facing surface 35a is shifted from the reference surface 35b in a direction away from the inner panel 22. Accordingly, upper and lower portions of the projecting portion 31 that are positioned on the opposite sides of the formation position of the stepped portion 35c are mutually different in width in the forward/rearward direction, and the lower portion of the projecting portion 31 on the insertion portion 17a side, which is positioned below the stepped portion 35c, is smaller in width than the upper portion of the projecting portion 31 on the frame exterior portion 17b side, which is positioned above the stepped portion 35c. In the following descriptions, the projecting portion 31 on the insertion portion 17a side will be referred to as a narrow-width frame portion 31a and the projecting portion 31 on the frame exterior portion 17b side will be referred to as a normal-width frame portion 31b. As shown in FIG. 17, the reference surface 35b of the outer peripheral side wall surface 35 that forms the normal-width frame portion 31b on the frame exterior portion 17b serves as a base surface which holds a weather strip 60. The weather strip 60 is fixed to and supported on the reference surface 35b by a fixing pin 61, and a hollow elastic-contact portion 60a of the weather strip 60 comes into contact with and is elastically deformed by the inner edge of a door opening (not shown) of the vehicle body side when the door 10 is closed, which makes the gap between the door 10 and the vehicle body watertight. In addition, a stepped portion 36c is also formed between the vehicle interior side wall surface 36 on the insertion portion 17a side (hereinafter referred to as an inner-panel facing surface 36a) and the vehicle interior side wall surface 36 on the frame exterior portion 17b side (hereinafter referred to as a reference surface 36b), and the inner-panel facing surface 36a is shifted from the reference surface 36b in a direction away from the inner panel 22 (see FIG. 6). Accordingly, the narrow-width frame portion 31a is smaller in width than the normal-width frame portion 31b in the direction of the thickness of the door 10 also.

The inner peripheral side flange portion 32 of the inner frame 30 is formed so that the inner peripheral side flange portion 32 on the frame exterior portion 17b is greater in width than the inner peripheral side flange portion 32 on the insertion portion 17a, and the inner peripheral side flange portion 32 on the insertion portion 17a side and the inner peripheral side flange portion 32 on the frame exterior portion 17b side are discriminated from each other and designated by reference marks 32a and 32b, respectively. On the other hand, the outer peripheral side flange portion 33 is formed so that the outer peripheral side flange portion 33 on the frame exterior portion 17b is greater in width than the outer peripheral side flange portion 33 on the insertion portion 17a, and the outer peripheral side flange portion 33 on the insertion portion 17a side and the outer peripheral side flange portion 33 on the frame exterior portion 17b side are discriminated from each other and designated by reference marks 33a and 33b, respectively.

The outer frame 40 is provided with a design surface 41 which faces toward the vehicle exterior side and a pane guide portion 42 having a concave cross sectional shape which is formed by bending the inner peripheral side edge of the design surface 41 toward the vehicle interior side. As shown in FIGS. 4 through 7 and 17, the outer frame 40 is mounted to the vehicle exterior side of the inner frame 30 and is fixed to the inner frame 30 by a hemming process in which the edge of the design surface 41 is folded toward the vehicle interior side to hold and fix an edge of the inner frame 30 in a sandwiched manner or by welding predetermined portions. In this fixed state, the design surface 41 fully covers the inner frame 30 at the frame exterior portion 17b, and the pane guide portion 42 is positioned along the inner peripheral side flange portion 32 of the inner frame 30. The pane guide portion 42 is extended from the upper edge of the rear side frame 17 to a portion thereof in the vicinity of the lower edge of the rear side frame 17; in the completed state of the door frame 12, an edge of the door pane 14 is moved up and down along the pane guide portion 42. A glass run not shown in the drawings is held in the pane guide portion 42. This glass run is provided with lips which elastically hold the edge of the door pane 14 which is inserted into the design surface 41 by being sandwiched by the side surfaces of the edge of the door pane 14 from the vehicle interior side and the vehicle exterior side. Although the details are omitted, a pane guide portion which is continuous with the pane guide portion 42 of the rear side frame 17 is also formed on the upper frame 15 and the front side frame 16.

As described above, the entire outer frame 40, the inner peripheral side flange portion 32 and the outer peripheral side flange portion 33 of the inner frame 30 constitute a design portion which faces toward the vehicle exterior side, and the rear side frame 17 has a cross sectional shape which makes the projecting portion 31 of the inner frame 30 project toward the vehicle interior side from this design portion. In the insertion portion 17a, the design portion is formed by the inner peripheral side flange portion 32a and the outer peripheral side flange portion 33a of the inner frame 30, though a major portion of the outer frame 40 does not exist.

Figure 8:
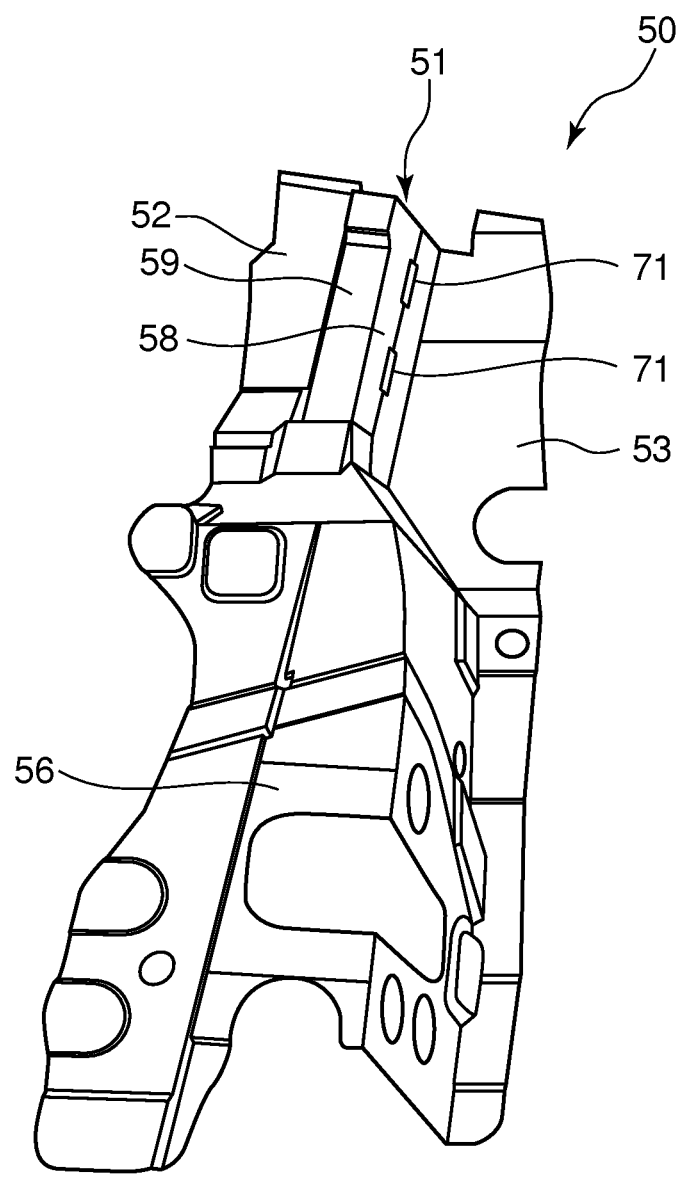
FIG. 8 is a diagram of a lock reinforcement member, viewed from the vehicle interior side.
Figure 9:
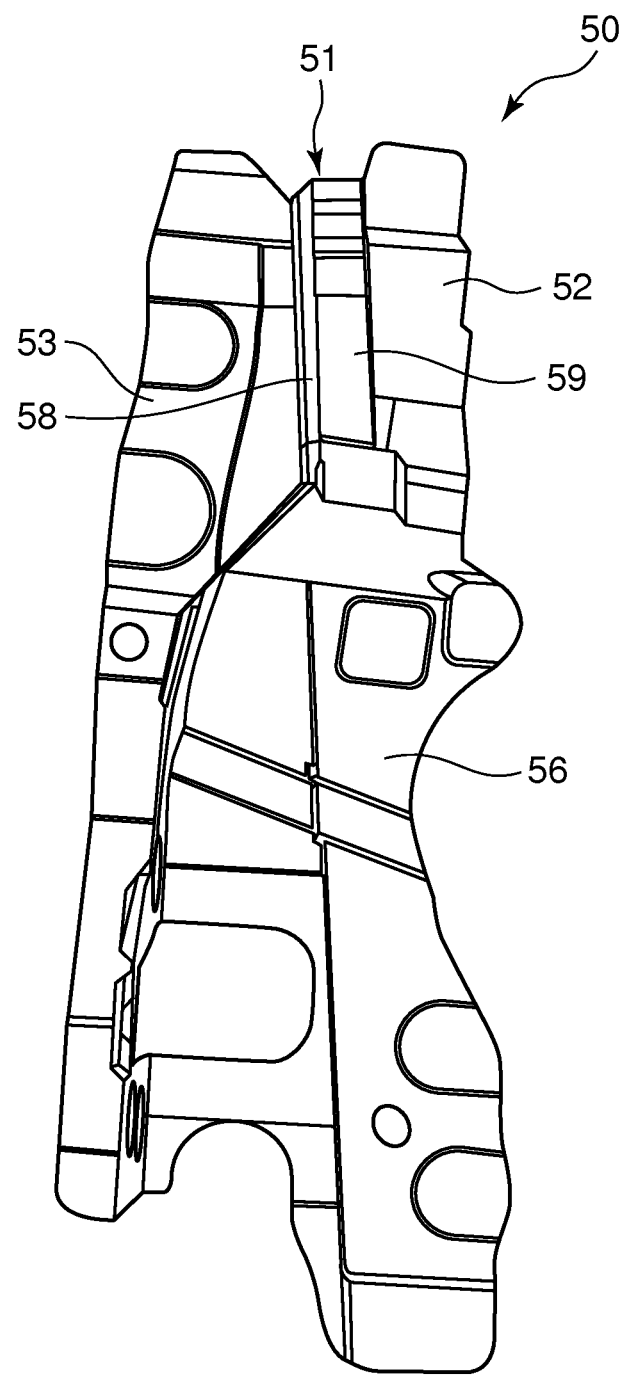
FIG. 9 is a diagram of the lock reinforcement member, viewed from the vehicle exterior side.
Figure 10:
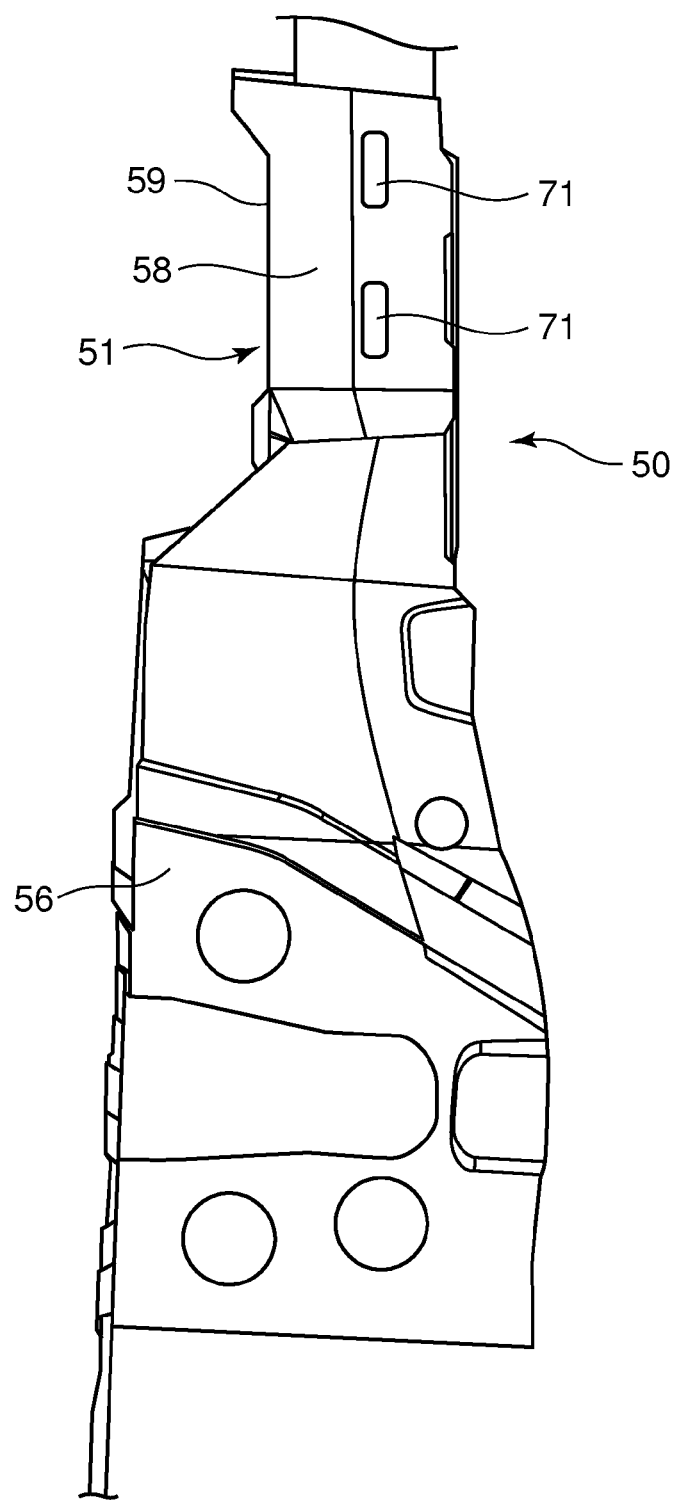
FIG. 10 is a diagram of the lock reinforcement member, viewed from the rear.

The lock reinforcement member 50 is formed of a sheet metal material by press working and has a shape so as to cover the insertion portion 17a of the rear side frame 17 from the vehicle interior side. As shown in FIGS. 8 through 10, the lock reinforcement member 50 is provided with a fitting depressed portion 51 which projects toward the vehicle interior side to allow the narrow-width frame portion 31a of the inner frame 30 to be fit-engaged therein, an inner peripheral flange portion 52 which is spaced toward the vehicle interior side of the inner peripheral side flange portion 32a of the insertion portion 17a, and an outer peripheral side flange portion 53 which is positioned on the vehicle interior side of the outer peripheral side flange portion 33a of the insertion portion 17a. The lock reinforcement member 50 is provided on a lower portion thereof with a door lock mounting portion 56, to which a door lock mechanism not shown in the drawings is mounted. The fitting depressed portion 51 is provided with an inner peripheral side wall surface 57 which extends along the inner peripheral side wall surface 34 at the narrow-width frame portion 31a of the rear side frame 17, an outer peripheral side wall surface 58 which extends along the inner-panel facing surface 35a, and a vehicle interior side wall surface 59 which extends along the inner-panel facing surface 36a. The distance between the inner peripheral side wall surface 57 and the outer peripheral side wall surface 58 corresponds to the distance between the inner peripheral side wall surface 34 and the outer peripheral side wall surface 35 at the insertion portion 17a. Welding holes 71 are formed through the outer peripheral wall surface 58.

Figure 11:
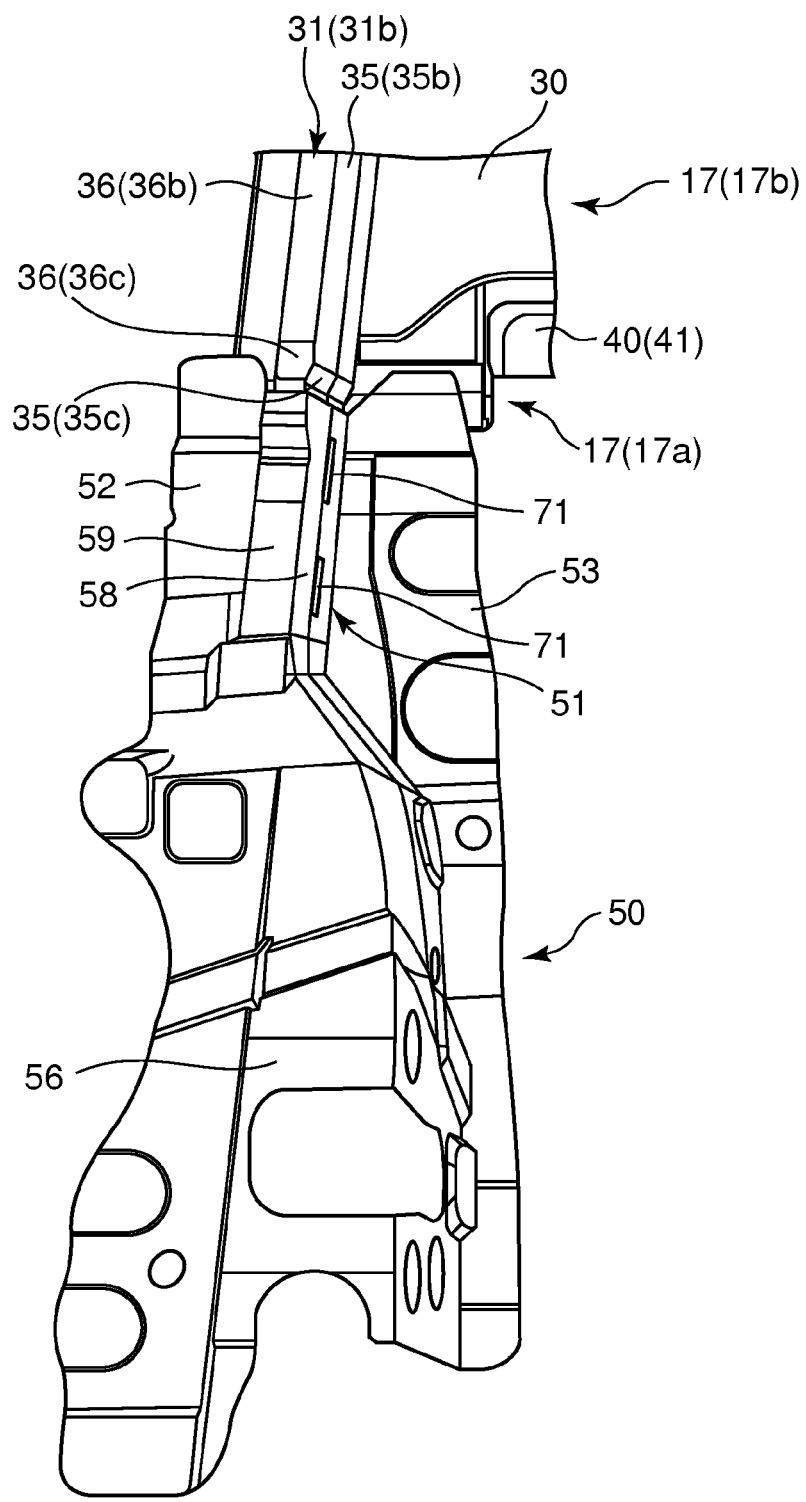
FIG. 11 is a diagram showing a state where the rear side frame is fixed to the lock reinforcement member, viewed from the vehicle interior side.
Figure 12:
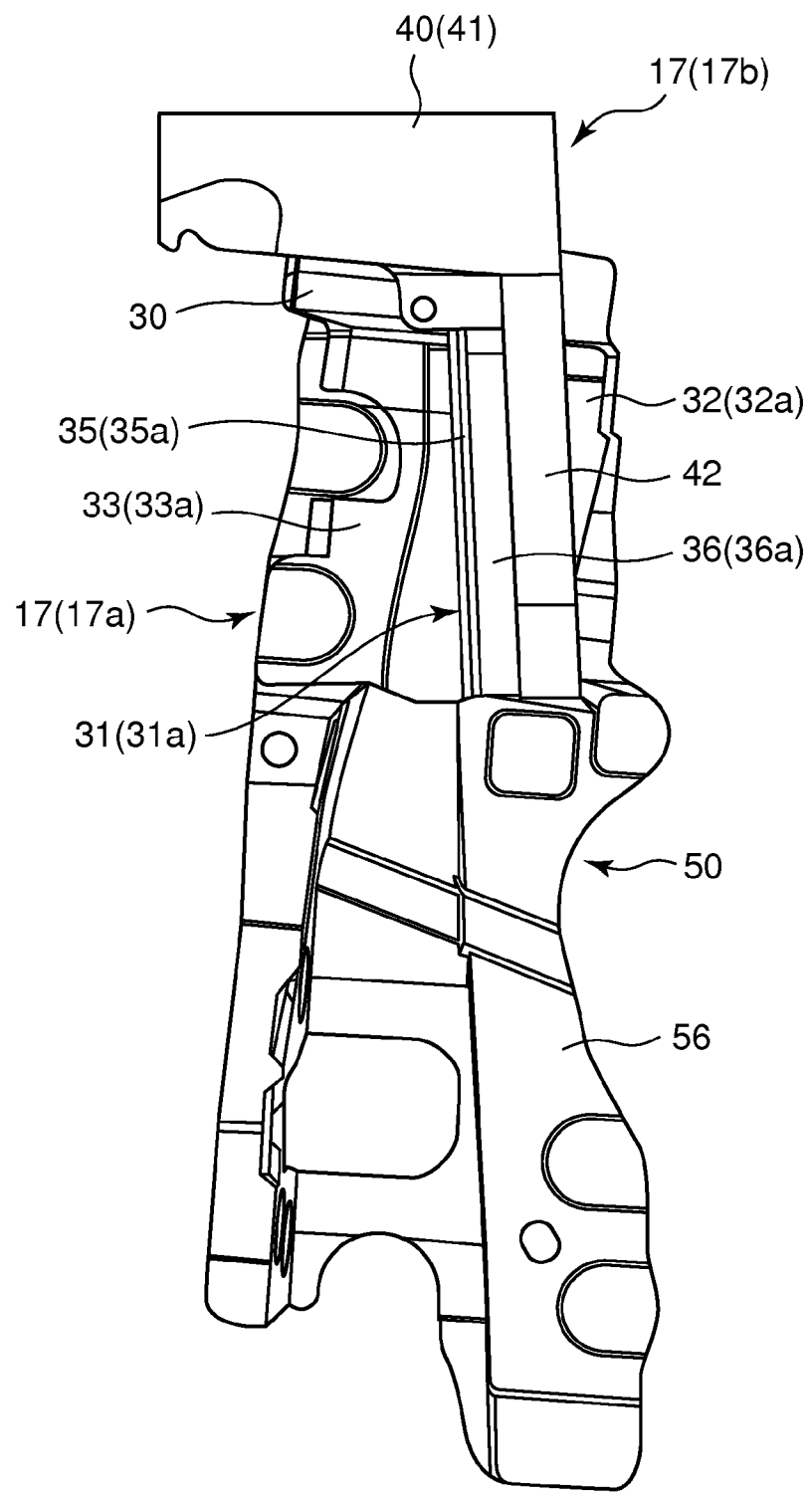
FIG. 12 is a diagram showing the state shown in FIG. 11, viewed from the vehicle exterior side.
Figure 13:
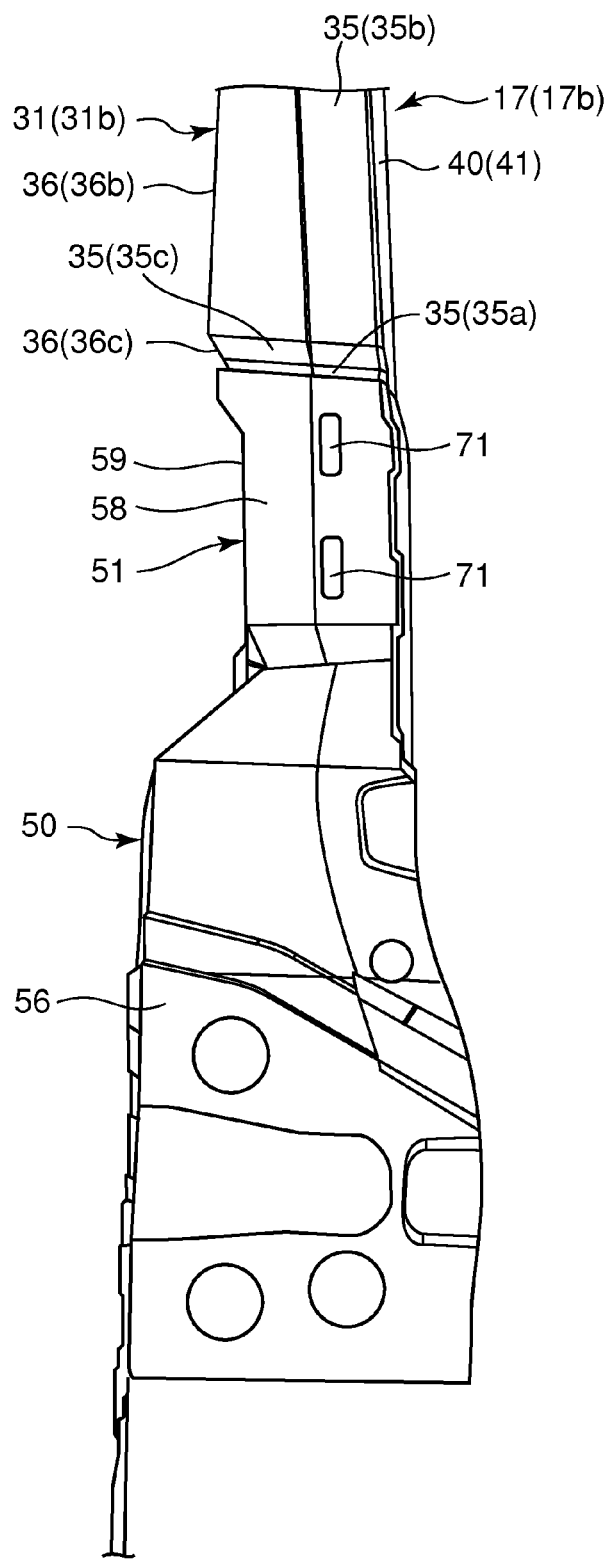
FIG. 13 is a diagram showing the state shown in FIG. 11, viewed from the rear.

The insertion portion 17a of the rear side frame 17 that is formed of a combination of the inner frame 30 and the outer frame 40 is fixed to the lock reinforcement member 50 as shown in FIGS. 11 through 13. The narrow-width frame portion 31a of the inner frame 30 is fitted in the fitting depressed portion 51 of the lock reinforcement member 50, and the outer peripheral side flange portion 33a comes in contact with the outer peripheral side flange portion 53. Thereupon, the width of the fitting depressed portion 51 in the forward/rearward direction, which covers the narrow-width frame portion 31a that is small in cross sectional area, substantially corresponds to the width of the normal-width frame portion 31b in the forward/rearward direction, which is great in cross sectional area, and the outer peripheral side wall surface 58 at the fitting depressed portion 51 of the lock reinforcement member 50 and the reference surface 35*b* at the normal-width frame portion 31*b* of the inner frame 30 are positioned to be substantially flush with each other. In addition, the vehicle interior side wall surface 59 of the lock reinforcement member 50 is positioned closer to the vehicle exterior side than the reference surface 36*b* of the normal-width frame portion 31*b*. In this mounted state, the inner-panel facing surface 35*a* is partly exposed through the welding hole 71 of the lock reinforcement member 50, and this exposed portion is welded. In this connection, the insertion portion 17*a* of the rear side frame 17 and the lock reinforcement member 50 are also welded at points other than the welding holes 71.

Figure 14:
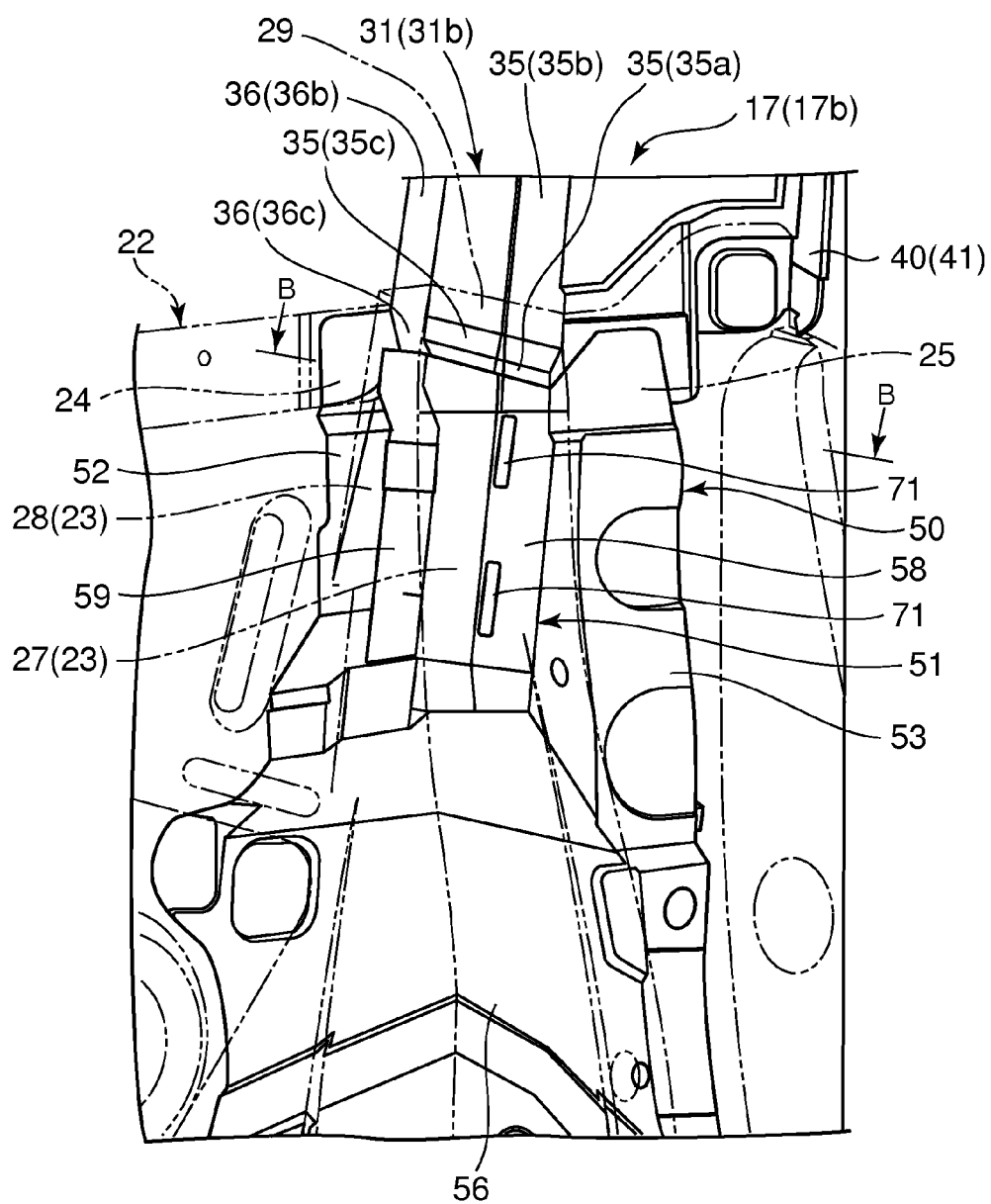
FIG. 14 is a diagram showing a state where the insertion portion of the rear side frame, the lock reinforcement member and the inner panel are overlaid and fixed together, viewed from the vehicle interior side.
Figure 15:
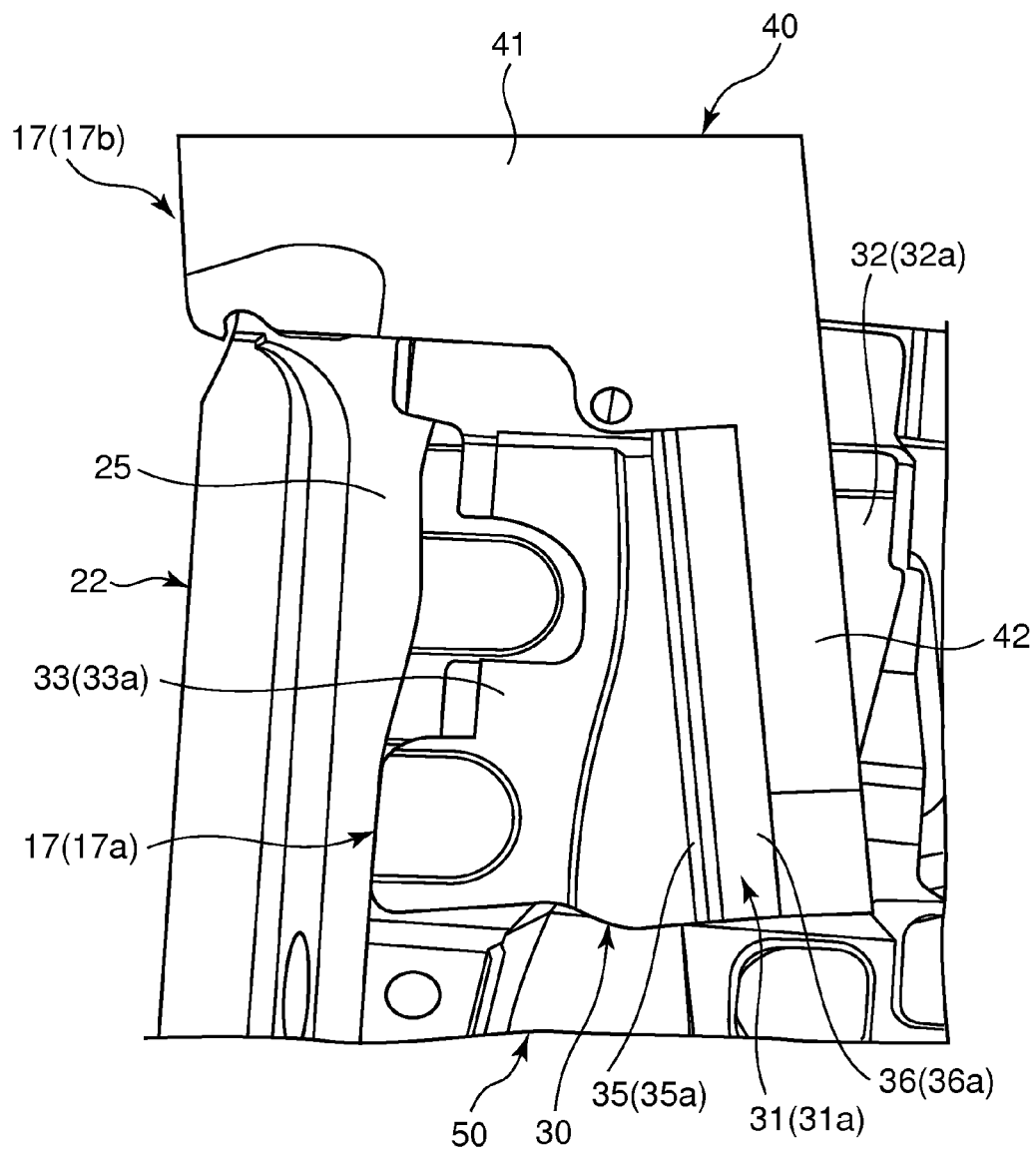
FIG. 15 is a diagram showing the state shown in FIG. 14, viewed from the vehicle exterior side.
Figure 16:
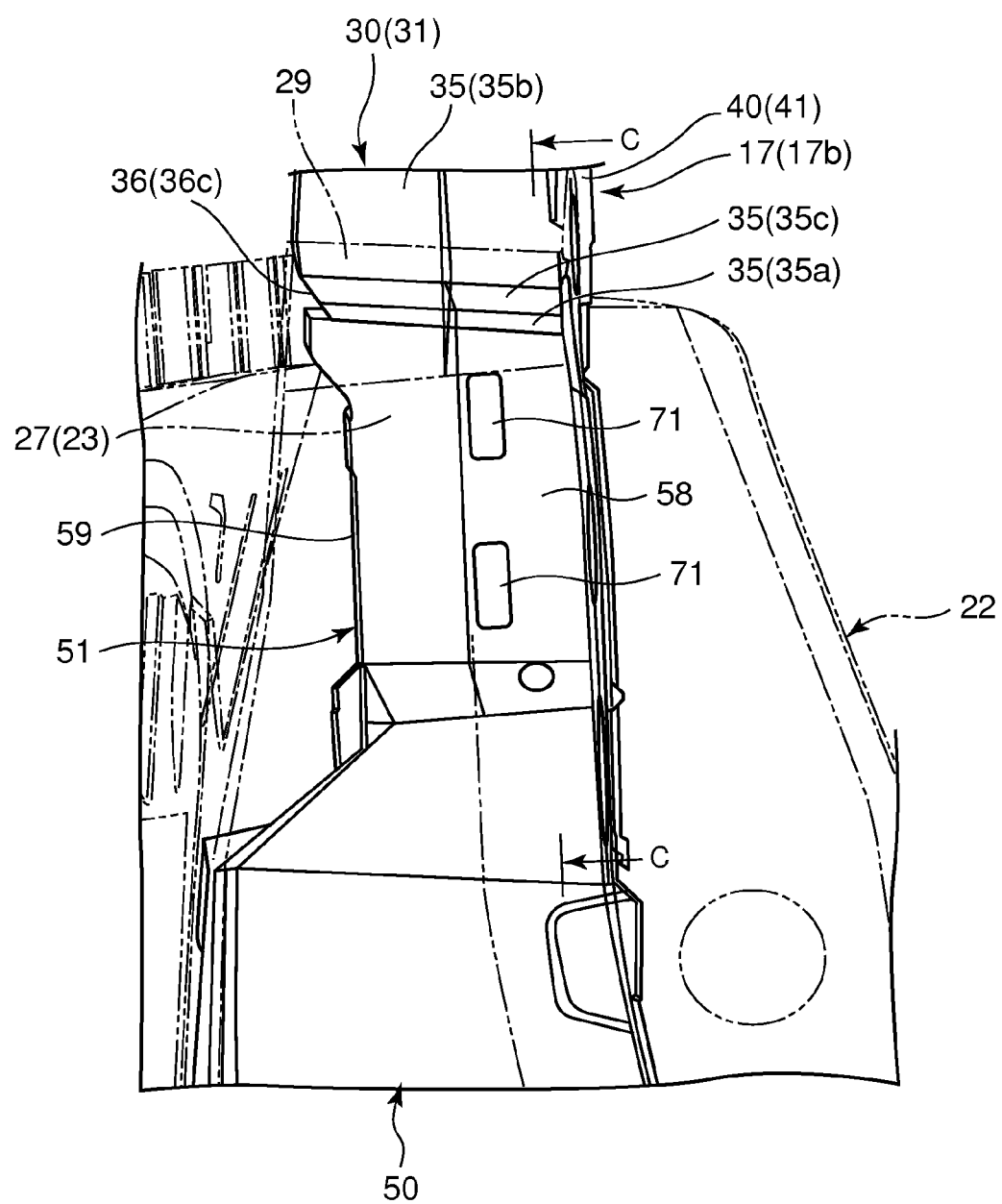
FIG. 16 is a diagram showing the state shown in FIG. 14, viewed from the rear.

The rear side frame 17 and the lock reinforcement member 50 which have been combined in the above described manner are fixed to the inner panel 22. FIGS. 14 through 16 show a portion of the inner panel 22 in the vicinity of the portion thereof which is fixed to the rear side frame 17 and the lock reinforcement member 50. At this fixing portion, the inner panel 22 has a shape that extends substantially along the lock reinforcement member 50, and the inner panel 22 is provided, as shown in FIG. 18, with a fitting depressed portion 23 which covers the fitting depressed portion 51 of the lock reinforcement member 50 from the vehicle interior side, an inner peripheral side flange portion 24 which covers the inner peripheral side flange portion 52 from the vehicle interior side, and an outer peripheral side flange portion 25 which covers the outer peripheral side flange portion 53 from the vehicle interior side. The fitting depressed portion 23 is provided with an inner peripheral side wall surface 26, an outer peripheral side wall surface 27 and a vehicle interior side wall surface 28 which extend along the inner peripheral side wall surface 57, the outer peripheral side wall surface 58 and the vehicle interior side wall surface 59 of the lock reinforcement member 50, respectively. Predetermined points on the inner peripheral side flange portion 52 and the outer peripheral side flange portion 53 of the lock reinforcement member 50 are welded to the inner peripheral side flange portion 24 and the outer peripheral side flange portion 25 of the inner panel 22, respectively. By fixing the insertion portion 17*a* of the rear side frame 17 and the inner panel 22 to each other with the lock reinforcement member 50 that is great in rigidity being sandwiched therebetween in the above described manner, the strength of the joined portion between the insertion portion 17*a* of the rear side frame 17 and the inner panel 22 is improved.

Figure 19:
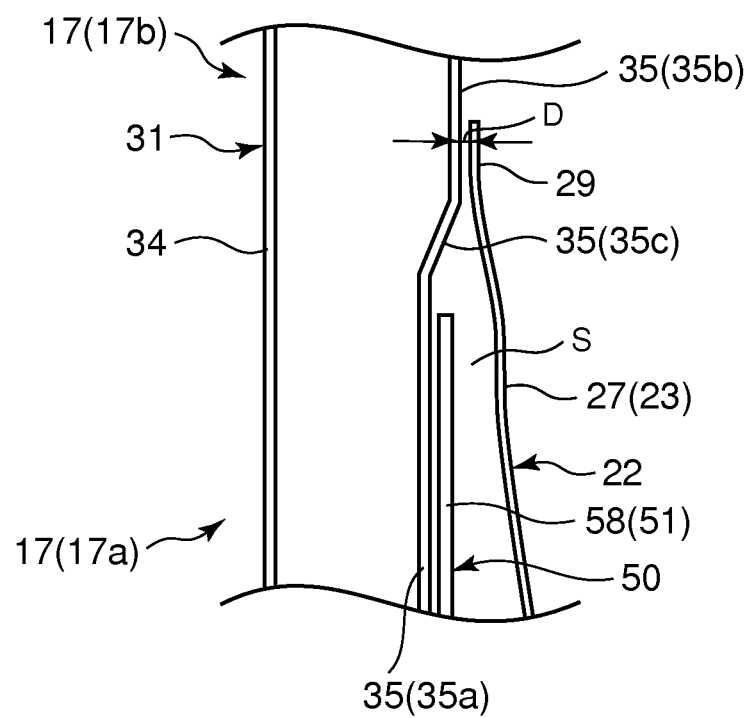
FIG. 19 is a cross sectional view taken along the line C-C shown in FIG. 16.

As shown in FIG. 19, an upper edge 29 of the inner panel 22 is positioned slightly above the stepped portion 35*c* (36*c*) that constitutes the boundary between the insertion portion 17*a* and the frame exterior portion 17*b* of the rear side frame 17. An upper edge clearance D is formed between the inner panel 22 and the rear side frame 17 (the frame exterior portion 17*b*). The upper edge clearance D provides a space that prevents the rear side frame 17 and the inner panel 22 from interfering with each other even when a slight manufacturing error exists, and the width of this clearance is set at a required minimal amount. The inner panel 22 is shaped to progressively bulge toward the vehicle interior side in the downward direction from the upper edge 29, and a space S that is greater in width than the upper edge clearance D is formed between the insertion portion 17*a* and the outer peripheral side wall surface 27 (the fitting depressed portion 23) of the inner panel 22. The lock reinforcement member 50 is positioned in the space S, and the configuration in which the narrow-width frame portion 31*a* that constitutes the insertion portion 17*a* and the normal-width frame portion 31*b* that constitutes the frame exterior portion 17*b* are made different in cross sectional size from each other causes the upper limit position of the lock reinforcement member 50 to increase to thereby widen the reinforcing area of the lock reinforcement member 50 for the insertion portion 17*a*, thus making it possible to improve the strength thereat. More specifically, the outer peripheral side wall surface 27 at the fitting depressed portion 23 of the inner panel 22 approaches the outer peripheral side wall surface 35 (the inner-panel facing surface 35*a*) of the inner frame 30 to narrow the width of the space S in a direction toward the upper edge 29, and the upper limit position for the installation of the lock reinforcement member 50 in the space S is defined as an uppermost position where the width of the space S exceeds the thickness of the lock reinforcement member 50 (the outer peripheral side wall surface 58) by a predetermined amount. In conventional structures, unlike the structure shown in FIG. 19, the stepped portion 35*c* is not formed between the reference surface 35*b* and the inner-panel facing surface 35*a* on the outer peripheral side wall surface 35 of the inner frame 30, and the reference surface 35*b* simply extends to the area of the insertion portion 17*a*, which causes the space S to narrow in width and causes the outer peripheral side wall surface 58 of the lock reinforcement member to be positioned at a position shifted from the position shown in FIG. 19 toward the right-hand side in FIG. 19. This causes the outer peripheral side wall surface 58 to interfere with the outer peripheral side wall surface 27 of the inner panel 22 if the height position of the outer peripheral side wall surface 58 remains at the position shown in FIG. 19, so that the position of the threshold width that allows the outer peripheral side wall surface 58 to be installed is consequently positioned lower than that shown in FIG. 19. As a result, the position of the lock reinforcement member 50 becomes lower than that shown in FIG. 19. In contrast, in the present embodiment, the stepped portion 35*c* is formed at a midpoint on the outer peripheral side wall surface 35 to shift the inner-panel facing surface 35*a* from the reference surface 35*b* in a direction away from the inner panel 22, which increases the height of the upper limit position for the installation of the outer peripheral side wall surface 58 of the lock reinforcement member 50, thus allowing the reinforcing amount of the lock reinforcement member 50 for the rear side frame 17 to increase.

Although FIG. 19 shows the position of a cross section passing through the outer peripheral side wall surface 35 of the rear side frame 17 and the outer peripheral side wall surface 58 of the lock reinforcement member 50, it is possible to increase the height of the upper limit position for the installation of the vehicle interior side wall surface 59 of the lock reinforcement member 50 while preventing the inner panel 22 from interfering with the vehicle interior side wall surface 59 at the vehicle interior side wall surface 36 of the rear side frame 17, since the inner-panel facing surface 36*a* that is positioned below the stepped portion 36*c* also has been shifted from the reference surface 36*b* in a direction away from the inner panel 22.

Figure 20:
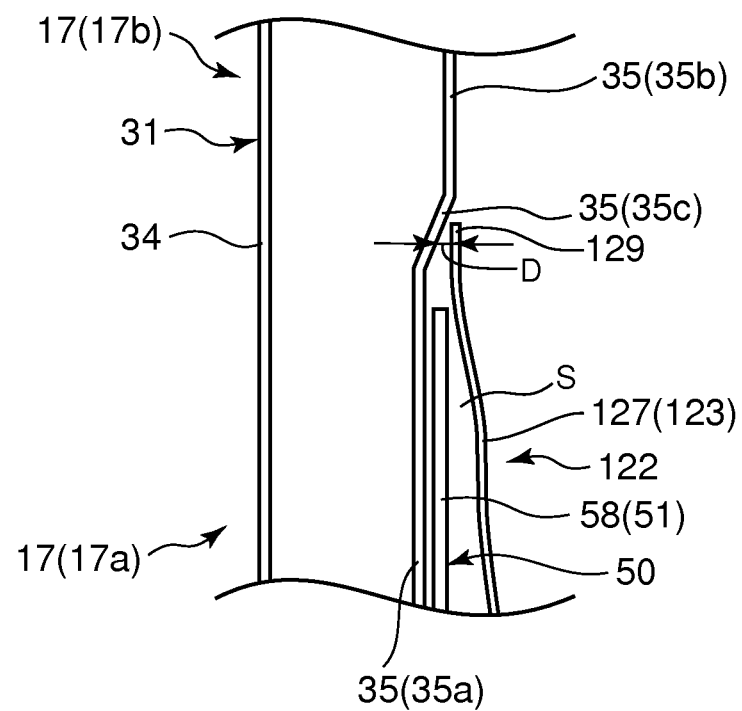
FIG. 20 is a cross sectional view showing another embodiment in which the positional relationship between the insertion portion of the rear side frame and the upper edge of the inner panel has been made different from that shown in FIG. 19.

FIG. 20 shows another embodiment in which the relative position between the insertion portion 17*a* of the rear side frame 17 and an inner panel 122 in FIG. 20 is different from that shown in FIG. 19 at the same cross sectional position as that shown in FIG. 19. In this embodiment, an upper edge 129 of the inner panel 122 is located at a position facing the stepped portion 35*c*, and the reference surface 35*b* on the frame exterior portion 17*b* side and the upper edge 129 of the inner panel 122 are substantially flush with each other. An upper edge clearance D which is substantially the same size as that shown in FIG. 19 is secured between the upper edge 129 of the inner panel 122 and the stepped portion 35*c* of the rear side frame 17. On the other hand, although being narrower in width than that shown in FIG. 19, a space S between the insertion portion 17a and the outer peripheral side wall surface 127 (a fitting depressed portion 123) of the inner panel 122, which is positioned below the upper edge clearance D, is sufficiently secured by the inner-panel facing surface 35a of the insertion portion 17a being shifted in a direction away from the inner panel 122, and the outer peripheral side wall surface 58 of the lock reinforcement member 50 does not interfere with the inner panel 122 even if the upper limit position of the outer peripheral side wall surface 58 of the lock reinforcement member 50 is set to be substantially the same position as that shown in FIG. 19. According to this structure shown in FIG. 20, foreign matter does not easily enter into the space S because the stepped portion 35c covers the top of the upper edge clearance D. In addition, no step is formed between the reference surface 35b that supports the weather strip 60 (see FIG. 17) and the upper edge 129 of the inner panel 22, so that an effect of improving the appearance is also obtained.

Although the present invention has been illustrated based on the above described embodiments, the present invention is not limited to these embodiments. For instance, although the above illustrated embodiments are examples in which the present invention has been applied to the part where the rear side frame 17 and the lock reinforcement member 50 are fixed to the inner panel 22 or 122, the present invention can also be applied to the part where the front side frame 16 and the front bracket 19 are fixed to the inner panel 22 or 122.

In addition, although the above illustrated embodiments are examples of application of the present invention to a vehicle front door, the present invention can be widely applicable to doors so long as they have a structure like those of the above described embodiments in which the door frame 12 is inserted into the door panel 11 and fixed thereto.

INDUSTRIAL APPLICABILITY

As described above in detail, the present invention relates to a vehicle door which includes a door frame having an insertion portion that is inserted in between a frame forming portion, which forms a window opening, and a door panel; and in which a reinforcing bracket is fixed between the insertion portion of the door frame and an inner panel, which constitutes a component of the door panel, wherein an inner-panel facing surface which constitutes a component of the insertion portion of the door frame is shifted in a direction away from the inner panel by a stepped portion, and wherein the upper limit position for the installation of the reinforcing bracket can be increased in height without the reinforcing bracket interfering with the inner panel by making the reinforcing bracket overlap the shifted inner-panel facing surface therealong. Accordingly, the strength of the joined portion between the door frame and the door panel can be improved by a simple structure, and the present invention can be widely applicable to a type of vehicle door having a door frame and a door panel.

REFERENCE SIGN LIST

10 Door
11 Door panel
12 Door frame
13 Window opening
14 Door pane (window)
15 Upper frame
16 Front side frame
16a Insertion portion
16b Frame exterior portion (frame forming portion)
17 Rear side frame
17a Insertion portion
17b Frame exterior portion (frame forming portion)
18 Beltline reinforcement member
19 Front bracket (reinforcing bracket)
21 Outer panel
22 122 Inner panel
23 123 Fitting depressed portion
24 Inner peripheral side flange portion
25 Outer peripheral side flange portion
26 Inner peripheral side wall surface
27 127 Outer peripheral side wall surface
28 Vehicle interior side wall surface
29 129 Upper edge of the inner panel
30 Inner frame
31 Projecting portion
31a Narrow-width frame portion
31b Normal-width frame portion
32 (32a 32b) Inner peripheral side flange portion
33 (33a 33b) Outer peripheral side flange portion
34 Inner peripheral side wall surface (projecting-portion forming surface/opposed wall surface)
35 Outer peripheral side wall surface (projecting-portion forming surface/opposed wall surface)
35a Inner-panel facing surface (surface area on the insertion portion side)
35b Reference surface (surface area on the frame forming portion side)
35c Stepped portion
36 Vehicle interior side wall surface (projecting-portion forming surface)
36a Inner-panel facing surface (surface area on the insertion portion side)
36b Reference surface (surface area on the frame forming portion side)
36c Stepped portion
40 Outer frame
41 Design surface
42 Pane guide portion
50 Lock reinforcement member (reinforcing bracket)
51 Fitting depressed portion
52 Inner peripheral side flange portion
53 Outer peripheral side flange portion
56 Door lock mounting portion
57 Inner peripheral side wall surface
58 Outer peripheral side wall surface
59 Vehicle interior side wall surface
60 Weather strip
61 Fixing pin
71 Welding hole

The invention claimed is:

1. A vehicle door comprising:
a door frame including an insertion portion which is inserted in between an inner panel and an outer panel, which constitute a door panel, and is supported therebetween; and a frame forming portion which projects from said door panel to form a window opening; and
a reinforcing bracket which is fixed between said insertion portion of said door frame and said inner panel,
wherein said door frame includes a projecting portion that projects from a design portion of said door frame toward a vehicle interior side across an area from said frame forming portion to said insertion portion,
wherein at least one projecting-portion forming surface which forms said projecting portion includes a stepped portion which separates a surface area on said frame forming portion side and a surface area on said insertion portion side from each other, wherein said surface area on said insertion portion side that is continuous with said stepped portion is formed as an inner-panel facing surface which faces said inner panel, wherein said inner-panel facing surface is shifted in a direction away from said inner panel by said stepped portion, wherein said reinforcing bracket overlaps with the shifted said inner-panel facing surface therealong, and wherein a space is formed between said insertion portion and said inner panel, and wherein said space becomes increasingly narrower towards said window opening.

2. The vehicle door according to claim 1, wherein an upper edge of said inner panel is provided at a position facing said stepped portion, and wherein said upper edge of said inner panel is substantially flush with said surface area on said frame forming portion side of said projecting-portion forming surface, which is continuous with the stepped portion.

3. The vehicle door according to claim 1, wherein said stepped portion is positioned within an area occupied by said inner panel.

4. The vehicle door ing to claim 1, wherein a thickness of said projecting portion along said projecting-portion forming surface has a substantially uniform thickness.

5. The vehicle door according to claim 1, wherein said projecting-portion forming surface comprises a vehicle interior side wall surface which faces toward said vehicle interior side, and opposed wall surfaces which are positioned on opposite sides of said vehicle interior side wall surface and are positioned away from each other toward an inner peripheral side and an outer peripheral side of said door frame, respectively, and wherein said stepped portion is formed on said opposed wall surface on the outer peripheral side.

6. The vehicle door according to claim 5, wherein a weather strip is supported on a surface area of said opposed wall surface on the outer peripheral side which is positioned on said frame forming portion side.

7. A vehicle door comprising:

a door frame including an insertion portion which is inserted in between an inner panel and an outer panel, which constitute a door panel, and is supported therebetween; and a frame forming portion which projects from said door panel to form a window opening; and a reinforcing bracket which is fixed between said insertion portion of said door frame and said inner panel, wherein said door frame includes a projecting portion that projects from a design portion of said door frame toward a vehicle interior side across an area from said frame forming portion to said insertion portion, wherein at least one projecting-portion forming surface which forms said projecting portion includes a bent portion bent toward said vehicle interior side, said bent portion separates a surface area on said frame forming portion side and a surface area on said insertion portion side from each other, wherein said surface area on said insertion portion side that is continuous with said bent portion is formed as an inner-panel facing surface which faces said inner panel, wherein said inner-panel facing surface is shifted in a direction away from said inner panel by said bent portion, wherein said reinforcing bracket overlaps with the shifted said inner-panel facing surface therealong, and wherein a space is formed between said insertion portion and said inner panel, and wherein said space becomes increasingly narrower towards said window opening.

8. A vehicle door comprising:

a door frame including an insertion portion which is inserted in between an inner panel and an outer panel, which constitute a door panel, and is supported therebetween; and a frame forming portion which projects from said door panel to form a window opening; and a reinforcing bracket which is fixed between said insertion portion of said door frame and said inner panel, wherein said door frame includes a projecting portion that projects from a design portion of said door frame toward a vehicle interior side across an area from said frame forming portion to said insertion portion, wherein at least one projecting-portion forming surface which forms said projecting portion includes a stepped portion which separates a surface area on said frame forming portion side and a surface area on said insertion portion side from each other, wherein said surface area on said insertion portion side that is continuous with said stepped portion is formed as an inner-panel facing surface which faces said inner panel, wherein said inner-panel facing surface is shifted in a direction away from said inner panel by said stepped portion, wherein said reinforcing bracket overlaps with the shifted said inner-panel facing surface therealong, and wherein a clearance is formed between said inner panel and said surface area on said frame forming portion side.

* * * * *